United States Patent [19]
Fannin

[11] 3,933,386
[45] Jan. 20, 1976

[54] REBOUND CONTROL FOR ENERGY ABSORBER UNIT

[75] Inventor: Wayne V. Fannin, Xenia, Ohio

[73] Assignee: General Motors Corporation, Detroit, Mich.

[22] Filed: Nov. 25, 1974

[21] Appl. No.: 526,833

[52] U.S. Cl............ 293/70; 293/DIG. 2; 188/322; 267/116
[51] Int. Cl.² ........................................ B60R 19/02
[58] Field of Search ...... 293/69, 70, 85, 86, DIG. 2; 267/139, 116; 188/282, 313, 317, 322

[56] References Cited
UNITED STATES PATENTS

| | | | |
|---|---|---|---|
| 2,820,771 | 6/1974 | Kerr et al.......................... | 293/70 X |
| 3,814,219 | 6/1974 | Fannin et al.................... | 267/116 X |
| 3,820,772 | 6/1974 | Kerr et al.......................... | 293/85 X |

*Primary Examiner*—John J. Love
*Attorney, Agent, or Firm*—Charles R. White

[57] ABSTRACT

The bumper assembly of a vehicle is supported by a pair of energy absorber units each of which incorporates a piston assembly which strokes in an inner cylinder to force gas from an inner chamber to a gas spring chamber through an expansible and contractable control chamber controlled by one-way valves and bleed orifices. On the return stroke, compressed gas in the control chamber exerts a force opposing the gas spring return force exerted on the piston assembly. Gas in the control chamber meters through the bleed orifices into the inner chamber so that the return rate of the piston assembly is effectively controlled and reduced.

4 Claims, 5 Drawing Figures

REBOUND CONTROL FOR ENERGY ABSORBER UNIT

This invention relates to energy absorber units for vehicles and more particularly to a telescoping energy absorbing unit incorporating a plurality of fluid pressurized chambers including an intermediate control chamber in series between primary energy absorbing chamber and an outer chamber with one-way valves and bleed orifices to control the return rate of the piston assembly of the unit.

The gas springs of many units used to absorb the energy of impact loads applied to a bumper have a high return velocity depending on friction and accelerated mass. Before this invention some prior art devices incorporated only a mechanical stop to dissipate the energy of return. Other devices employed added mechanical friction shoes or friction mechanisms to provide an added mechanical drag load to dissipate return energy and thereby reduce rebound forces to prevent damage to vehicle components. The present invention eliminates such mechanical devices and provides an expansible control chamber, with one-way valves and bleed orifices, which expands on the primary energy absorbing stroke of the unit. On the return stroke gas trapped in the control chamber provides a gradually reducing force opposing the recovery force. The pressure in the control chamber gradually reduces as gas trapped therein bleeds off to control the rate of return of the energy absorbing piston.

An object of this invention is to provide a new and improved energy absorbing unit with a control chamber in series between a primary and a gas spring chamber which is charged with fluid during a primary energy absorbing phase of operation and which is subsequently sealed by one way valves to provide a force that reduces the recovery rate of the piston assembly of the unit.

Another object of this invention is to provide a new and improved energy absorbing unit having a control chamber interposed between a primary energy absorbing chamber and a gas spring chamber to control the rate of return of a piston assembly in moving from a telescoped position to a fully extended position.

Another object of this invention is to provide a new and improved energy absorbing unit with one-way valves having shaft and face seals for effective rebound control and which allows for misalignment of components in the system.

These and other objects, advantages and features of this invention will be more apparent from the following detail description and drawing in which.

Figure 1:
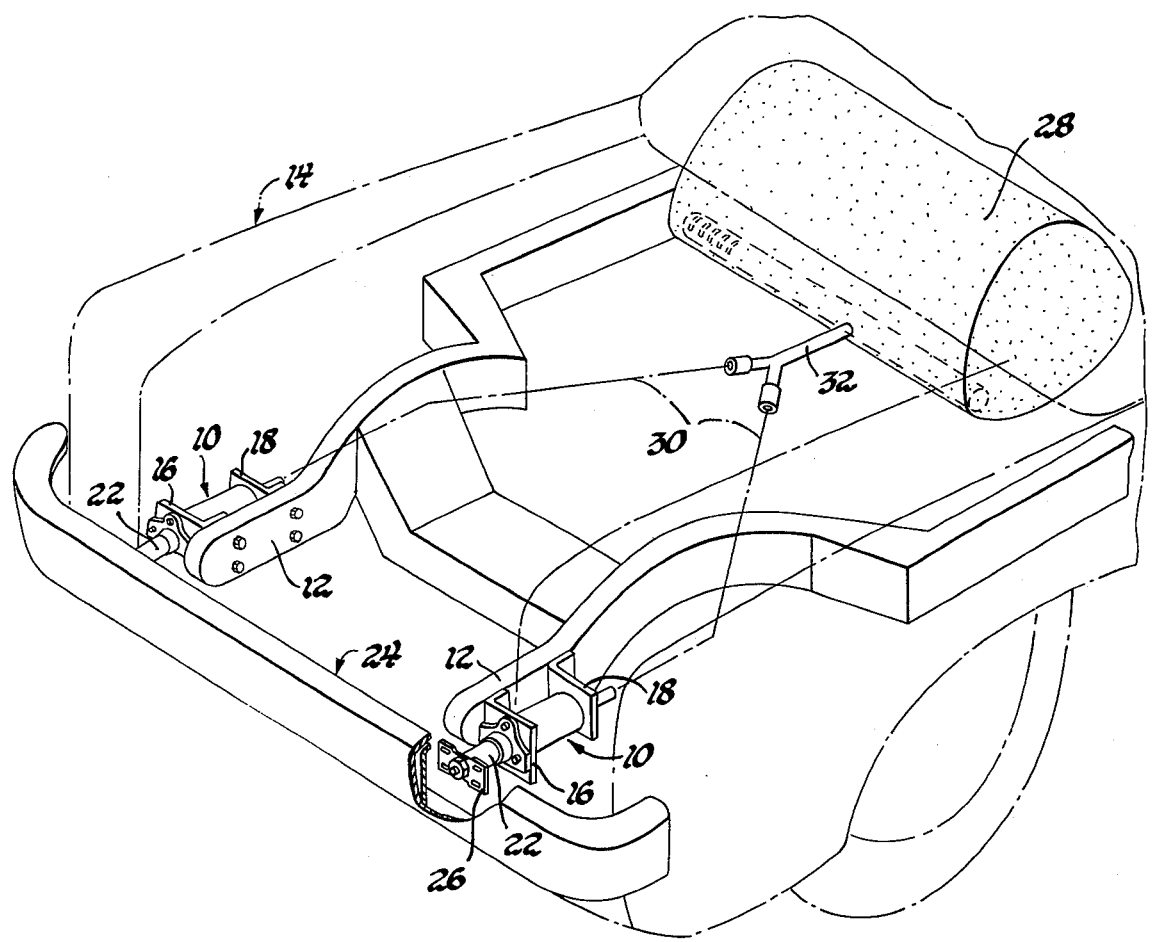
FIG. 1 is a perspective view of an energy absorbing system incorporating this invention.

Turning now in detail to the drawing, there is shown in FIG. 1 a pair of energy absorbing units 10 each secured to the side rails 12 of the frame of vehicle 14 by front and rear bracket assemblies 16 and 18. Each energy absorbing unit has a piston assembly 20 that includes an axially projecting piston rod 22 which is attached to a bumper assembly 24 by a connecting bracket 26. The energy absorbing units 10 provide for the inward movement of the bumper assembly 24 when impacted by at least a minimum impact force to dissipate impact energy. After the impact load is removed the energy stored in units 10 automatically return the bumper assembly to its original extended position.

The energy absorbing units 10 are operatively connected to an inflatable safety bag 28 by pneumatic lines 30 and 32. The safety bag is mounted in the interior of the vehicle in a collapsed package and is automatically inflated in response to a predetermined impact load applied to the bumper assembly 24 which strokes the piston assembly of either one or both of the energy absorbing units a predetermined distance. The piston assembly 20 of each energy absorbing unit includes a piston 34 which is mounted for sliding movement in an inner cylinder 36 of energy absorbing unit 10 and cooperates therewith to form an expansible and contractable chamber 38 that contains a pressurized gas. As the piston assembly strokes rearwardly the piston 34 will reduce the volume of the chamber 38 to force gas from this chamber through special valve constructions which will be later described to absorb impact energy.

The inner cylinder 36 extends axially from an annular end wall 42 which closes a casing or outer cylinder 44. The outer cylinder 44 surrounds the inner cylinder 36 and provides a chamber 46 which contains a pressurized gas for inflating the safety bag 28 and to provide a gas spring to return the piston assembly back to its original position after the impact force is removed.

To provide for air bag inflation after a predetermined stroke of the piston assembly, the outer cylinder 44 is formed with a punch disk 48 secured in an end wall 50 thereof which seals the chamber 46 from a hose fitting 52. The hose fitting 52 projects axially from end wall 50 through bracket 18 and into the end of pneumatic line 30 which may be a high pressure hose suitably clamped on the hose fitting. The punch disk 48 may be fractured by the end 56 of a pin 58 that extends longitudinally axially from the piston 34 of the piston assembly. The inner cylinder 36 has an end cap 62 secured thereto that has a central stepped recessed portion 64 and a center passage 66 through which pin 58 extends. An intermediate cylinder 68 is mounted for telescoping movement on the inner cylinder 36. An annular elastomeric fluid seal 69 supported in a groove in cylinder 36 slidably engages the inner wall of cylinder 68. The intermediate cylinder 68 has an end wall 70 with a central opening 72 through which a reduced diameter portion 73 of pin 58 extends. As shown the inner peripheral edge of opening 72 abuts a shoulder 74 on pin 58 so that the pin 58 will move the intermediate cylinder 68 axially when the piston assembly is stroked into cylinder 36.

This stroking movement expands a captive return control chamber 76 formed between the end cap 62 of the inner cylinder 36 and the intermediate cylinder 68. Gas trapped in the return control chamber 76 on the primary energy absorbing stroke of the piston assembly is subsequently bled off on the recovery stroke through special valve devices to control the return speed of the piston assembly 20 in moving the bumper assembly back to its original position.

As shown a disk-like valve element 80, preferably of a suitably elastomeric material, is closely fitted on pin 58 so that it can move with pin 58 a limited distance within the confines of the stepped recessed portion 64 of cap 62. The valve element 80 has a front face which contacts a front face portion 82 of cap 62 to provide a one-way valve to seal chamber 76 on the recovery stroke of the piston assembly. The valve element 80 is formed with radial grooves 84 and 86 formed in the front faces thereof to bleed gas from chamber 76 into chamber 38 on the recovery stroke to control the rate of the recovery stroke of piston assembly 20. A ring-like retainer 88 is snapped fitted in a groove in cap 62 to confine the valve element 80 in the recess portion of the cap 62. This retainer has openings 90 and clearance 92 between the internal peripheral portion of the retainer and the outer periphery of pin 58 to facilitate the passage of gas therethrough. Also the retainer has an axially extending abutment portion 93 to engage the valve element 80 to limit its movement in the recessed portion of the cap 62.

In addition to supporting the valve element 80 the pin 58 supports a second ring-like valve element 94 of a suitable elastomeric material on the reduced diameter portion 73 which extends outwardly through the opening 72 of end wall 70. This valve element is adapted to engage wall 70 on the recovery stroke of the piston assembly to seal chamber 76 from chamber 46. As shown valve element 94 is trapped between the end wall 70 of cylinder 68 and a nut 98 threaded on the reduced diameter portion 73 of pin 58. As the piston rod assembly and connected pin 58 move inwardly the valve element 80 moves axially with respect to the face 82 of cap 62 to open this valve so that gas can flow from chamber 38 onto return control chamber 76. Gas in chamber 76 can flow through the restriction provided by the second valve element 80.

The piston rod 22 has a stop collar 100 which is seated on a shoulder portion thereof adjacent to front bracket 26. The collar 100 has a radially flared shear ring 102 at the inner end thereof which is adapted to contact a projecting stop 104 that extends outwardly from the end wall 42. This ring limits the inward movement of the piston assembly when the bumper is impacted by a predetermined impact load to prevent rupture of the punch disk 48 at low speed so that there will be no inflation of the safety bag on low speed impacts. At high speed impacts, such as at 10 mph the ring 102 will be sheared to permit the further inward travel of the piston assembly so that the punch disk will be contacted and ruptured by the end 56 of the pin 58 to cause the inflation of the safety bag 28. The enlarged shoulder portion 103 of the piston rod 22 contacts the internal wall of the stop 104 to limit the travel of the piston assembly in the return stroke.

The end walls 50 of the outer cylinder support a valve assembly 108. This valve assembly provides an entrance for the supply of gas into the energy absorbing unit 10 and also for the pressure relief of the unit in the event of excessive gas pressure therein. The valve assembly 108 is fully described in my U.S. Pat. No. 3,834,412, issued Sept. 10, 1974 and need not be further described here.

Figure 2:
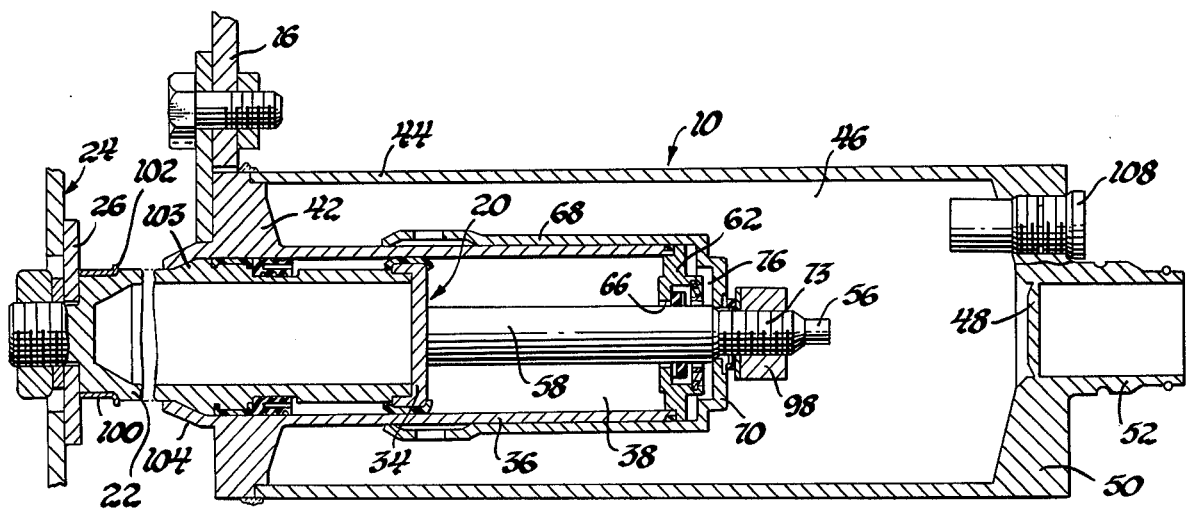
FIG. 2 is a longitudinal cross-section view of one of the energy absorbing units used in the FIG. 1 embodiment.
Figure 3:
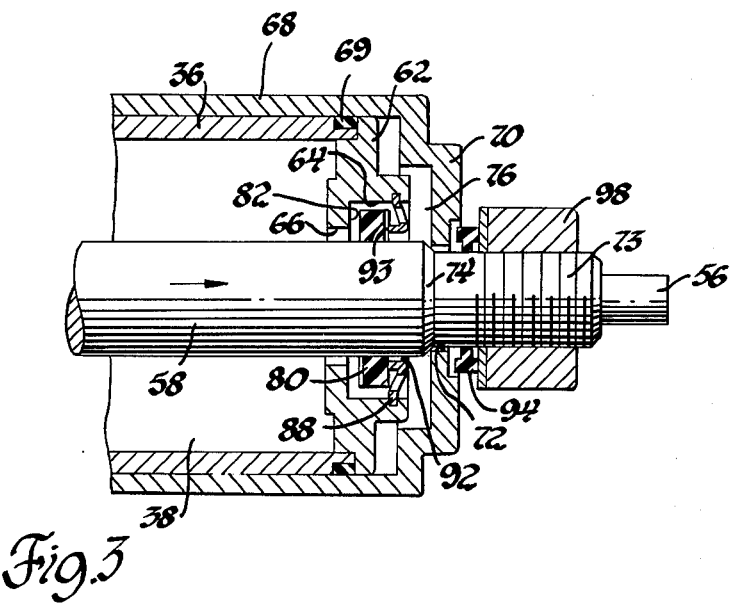
FIG. 3 is an enlarged view of a portion of FIG. 2 illustrating a first phase of operation.
Figure 4:
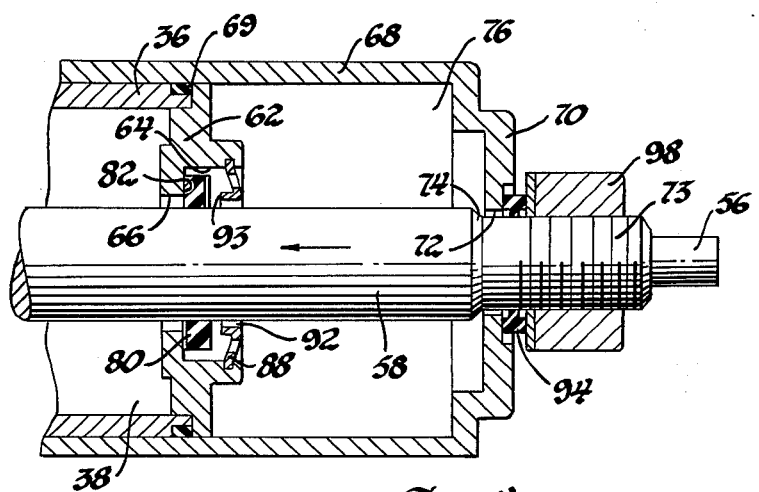
FIG. 4 is a view similar to that of FIG. 3 showing the construction in a moved position.
Figure 5:
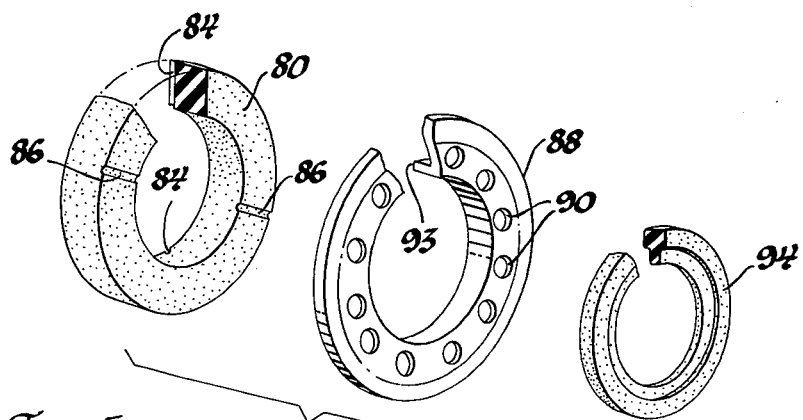
FIG. 5 is an exploded perspective view of the valve devices used in the energy absorbing unit of FIGS. 1 - 4.

When the bumper assembly is impacted by a force which moves it inwardly, the piston assembly 20 is stroked in cylinder 36. As the piston assembly moves inwardly as shown in FIG. 3, the valve element 80 will be carried by rod 58 into engagement with the abutment 93 of retainer 92. Gas in chamber 38 flows in a restriction around the valve element 80 into control chamber 76 as it expands to absorb impact energy. Also if pressure in chamber 76 is sufficiently high, gas will flow from chamber 76 to chamber 46 through the imperfect seal between shoulder 74 and the inner edge of opening 72 and past the restriction provided by valve element 94 and end wall 70. On the completion of the energy absorbing stroke, the control chamber 76 may be in the expanded position as shown in FIG. 4. The gas in chamber 46 compressed by the inward movement of the intermediate cylinder 68 acts as a spring and exerts a force on the end wall 70 of cylinder 68 to urge cylinder 68 and the connected piston assembly 20 back toward the FIG. 2 position. When this movement begins the valve element 80 is moved into engagement with the face portion 82 of cap 62 to seal chamber 76. The gas trapped in chamber 76 by the two valve elements 80 and 94 exerts a force on the cylinder 68 opposing the spring force of the gas in chamber 46. As the gas in the control chamber 76 bleeds back into chamber 38 the piston assembly returns to its original position at a low velocity to prevent damage from the recovery stroke.

While a preferred embodiment of this invention has been shown and described other embodiments and modifications will now be apparent to those skilled in the art. Accordingly, this invention is not limited by the disclosure of a preferred embodiment but only by the following claims.

I claim:

1. A telescoping energy absorbing unit for a vehicle operatively connecting a bumper assembly to the vehicle comprising a first cylinder secured to the vehicle, a piston assembly mounted for telescopic movement between first and second positions with respect to said first cylinder, said piston assembly having a piston and a piston rod axially projecting from said piston, means operatively connecting said piston rod to the bumper assembly, said piston cooperating with said first cylinder to form a first expansible and contractable chamber, a second cylinder mounted for sliding movement on said first cylinder and cooperating therewith to form a second expansible and contractable chamber, means drivingly connecting said second cylinder to said piston assembly for movement therewith, a sealed housing surrounding said first and second cylinders and cooperating therewith to form a third chamber, a pressurized fluid medium in said first, second and third chambers, first valve means operatively connected between said first and second cylinders to permit the flow of fluid from said first chamber into said second chamber when said piston assembly is moved from said first position toward said second position and to subsequently restrict and meter the flow of fluid from said second chamber into said first chamber in response to the movement of said piston assembly back to said first position, and second valve means operatively connected between said second and third chambers to seal said second chamber from said third chamber so that the fluid trapped in said second chamber exerts a force to reduce the rate of recovery of said piston assembly in moving to said first position.

2. A telescoping energy absorbing unit operatively connecting a bumper assembly to a vehicle comprising a first cylinder secured to the vehicle, a piston assembly operatively connected to said bumper assembly and operatively mounted in said first cylinder for telescoping movement between first and second positions with respect to said first cylinder, said piston assembly incorporating a piston slidably mounted in said first cylinder to form an expansible and contractable first chamber, a second cylinder mounting for sliding movement on said first cylinder and cooperating therewith to form a second expansible and contractable chamber, means drivingly connecting said second cylinder to said piston assembly, a sealed housing surrounding said first and second cylinders to form a third chamber connected in series with said first and second chambers, a pressurized gas in said chambers, first valve means operatively connected between said first and second chambers and second valve means operatively connected between said second and third chambers to permit the flow of gas from said first chamber through said second chamber into said third chamber in response to the contraction of said first chamber and the expansion of said second chamber, said first valve means being operative to subsequently seal said second chamber and to meter the gas from said second chamber into said first chamber in response to the movement of said piston assembly from said second position toward said first position by the spring force exerted on said second cylinder to thereby reduce the speed of said piston assembly when moving to said first position.

3. A telescoping energy absorbing unit operatively connecting a bumper assembly to a vehicle comprising a first cylinder secured to the vehicle, a piston assembly operatively connected to the bumper assembly mounted for telescoping movement between first and second positions in said first cylinder, said piston assembly incorporating a piston and a piston rod operatively connecting said piston to the bumper assembly, said piston cooperating with a first cylinder to form a first expansible and contractable chamber, a second cylinder mounted for sliding movement on said first cylinder and cooperating therewith to form a second expansible and contractable chamber, a pin axially extending from said piston through said first and second cylinders to drivingly connect said second cylinder to said first piston assembly, a housing surrounding said first and second cylinders to form a third chamber, a pressurized gas in said chambers, a one-way valve carried by said pin and operatively disposed between said pin and the first cylinder to permit the flow of gas from said first chamber into said second chamber in response to movement of piston assembly toward said second position, said valve having bleed passage means therein to limit the flow of gas from said second chamber into said first chamber to limit the rate of travel of said piston assembly in moving toward said second position, an additional valve means operatively disposed between said third chamber and said second chamber to prevent the flow of gas from said third chamber into said second chamber when said piston assembly moves toward said second position.

4. A telescoping energy absorber unit operatively connecting a bumper assembly to a vehicle comprising a first cylinder secured to the vehicle, a piston assembly connected to the bumper assembly mounted for telescopic movement between first and second position in said first cylinder, said piston assembly having a piston and a piston rod axially projecting from said piston, said piston cooperating with said first cylinder to form a first expansible and contractable chamber, a second cylinder mounted for telescopic movement on said first cylinder and cooperating therewith to form a second expansible and contractable chamber, means drivingly connecting said second cylinder to said piston assembly, a sealed housing surrounding said first and second cylinders to form a third chamber, a pressurized gas in said chambers, said gas in said third chamber providing a spring force acting on said second cylinder for urging said piston assembly to said first position, valve means operatively connected between said first and second chambers to permit the flow of fluid from said first chamber into said second chamber in response to the inward telescoping movement of said piston assembly toward said second position and to subsequently restrict and meter the flow of fluid from said second chamber to said first chamber in response to movement of said piston assembly to said second position to reduce the speed of said piston assembly in moving to said second position, and additional valve means to block the flow of gas from said third chamber into said second chamber when said piston assembly is moving to said first position.

\* \* \* \* \*